United States Patent [19]

Maupre et al.

[11] 4,290,822

[45] Sep. 22, 1981

[54] PROCESS FOR CLEANING A COLD TRAP

[75] Inventors: Jean-Pierre Maupre; Jean Trouve, both of Pertuis, France

[73] Assignee: Commissariat a l'Energie Atomique, Paris, France

[21] Appl. No.: 94,165

[22] Filed: Nov. 14, 1979

[30] Foreign Application Priority Data

Dec. 4, 1978 [FR] France .................... 78 34093

[51] Int. Cl.³ .................... B08B 3/08; B08B 3/10
[52] U.S. Cl. .................... 134/19; 134/22 R; 176/37
[58] Field of Search .................... 134/19, 22 R, 30, 42; 176/37; 75/66

[56] References Cited

U.S. PATENT DOCUMENTS

3,831,912  8/1974  Shimoyashiki et al. ............ 75/66 X
3,941,586  3/1976  McKee ............................ 176/37 X

FOREIGN PATENT DOCUMENTS

601763  4/1978  U.S.S.R. ............................ 176/37

*Primary Examiner*—Marc L. Caroff
*Attorney, Agent, or Firm*—Kerkam, Stowell, Kondracki & Clarke

[57] ABSTRACT

A cold trap incorporated into a liquid metal circuit is cleaned by introducing an alkali metal hydroxide in liquid state into the trap and in excess compared with solubility limits of deposited impurities, then heating the trap to totally transform the impurities into liquid phases and draining off these liquid phases. The cleaning operation is carried out in the absence of water.

4 Claims, 1 Drawing Figure

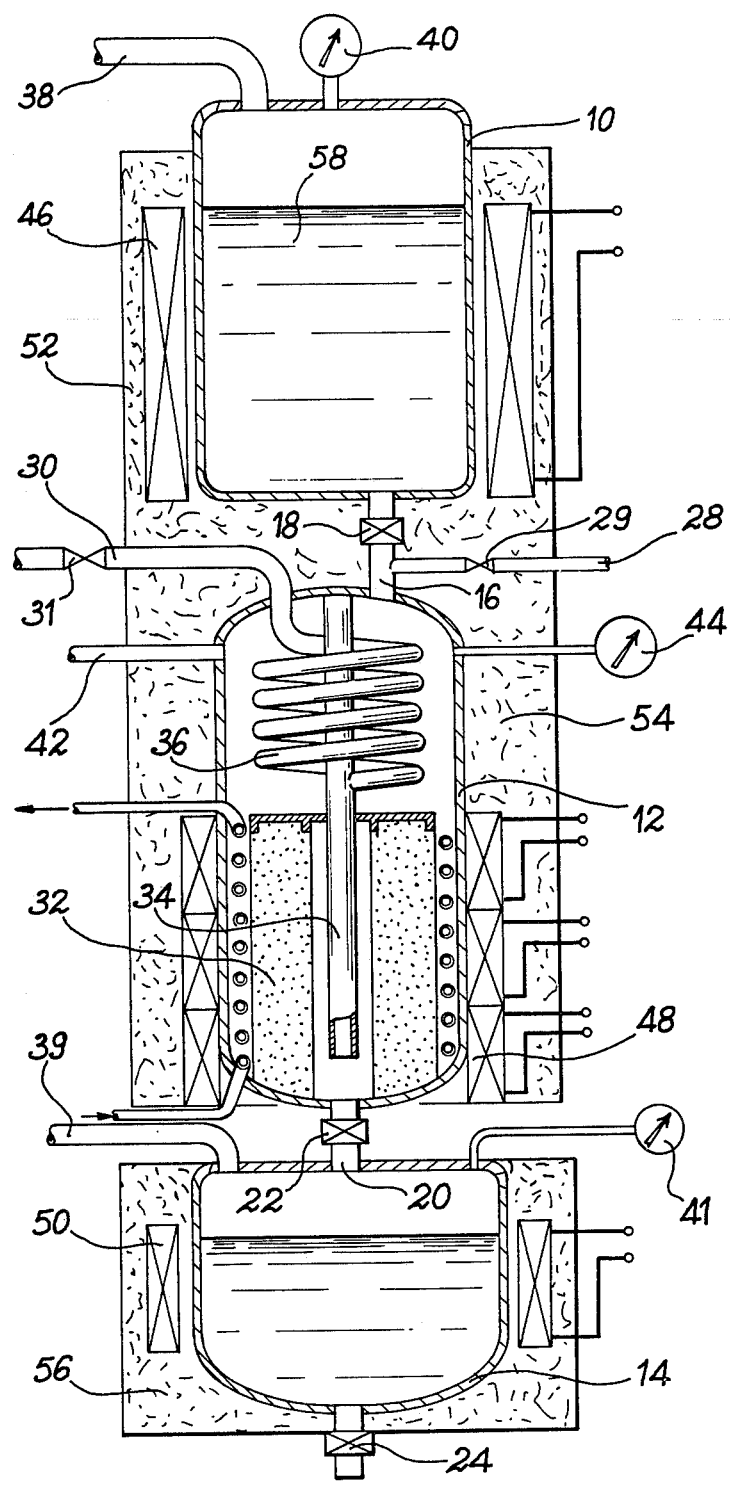

PROCESS FOR CLEANING A COLD TRAP

BACKGROUND OF THE INVENTION

The invention relates to a process for cleaning a cold trap incorporated into a liquid metal circuit. This type of trap is most frequently used in a sodium or sodium-potassium alloy circuit and serves to carry out the crystallisation and elimination of impurities such as, in the case of a sodium circuit, sodium hydride and sodium oxide. The cleaning of the trap makes its reuse for storage possible, preferably after decontamination. The invention also relates to an apparatus for performing this process.

In high and medium power nuclear reactors, it is necessary to have a cooling fluid, whose thermal conductivity coefficient is high, in such a way as to be able to utilise to the maximum the power possibilities of the reactor. For this purpose and despite the difficulties resulting from the use of such materials, liquid metals are frequently used for extracting the heat supplied by such reactors. Sodium is one of the metals used in this way. Due to the very special circulation conditions of the liquid metal for cooling the reactor, impurities are formed in this metal which are eliminated by means of at least one cold trap arranged in the circuit. The main impurities trapped in this way are, in the case of sodium, sodium hydride (NaH), sodium oxide (Na$_2$O) and sodium hydroxide (NaOH). Due to the temperature of the trap, these impurities are in the solid state in such a way that after the reactor has been in use for a certain time it may become necessary to clean the trap or traps located in the circuit, due to the reduction in the purified sodium flow and even the danger of clogging. Various processes have already been proposed for cleaning a cold trap incorporated into a sodium circuit.

According to a first known process, the trap is heated at about 420° C. and is scavenged with neutral gas. Under these conditions, the sodium hydride decomposes in accordance with the following reaction (1):

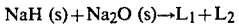

$$NaH\ (s) + L_1 + \tfrac{1}{2} H_2\ (g) \qquad (1)$$

in which L$_1$ is a liquid solution of hydrogen and oxygen in the sodium, the oxygen coming from the sodium oxide which is still present in the cold trap at the same time as the hydride.

Thus, this process permits the total decomposition of the sodium hydride. However, only a small fraction of the sodium oxide is converted into hydroxide according to reaction (2):

$$Na_2\ (s) + \tfrac{1}{2} H_2\ (g) \rightarrow L_1 + L_2 \qquad (2)$$

in which L$_2$ is a liquid solution of hydrogen and oxygen in sodium hydroxide.

Thus, the slow kinetics of the latter reaction do not permit its completion during the cleaning period. Thus, this process is not suitable because it does not permit the total transformation of the sodium oxide within reasonable periods of time. Moreover, the tritium present in the cold trap is discharged in the gaseous effluents, which is a disadvantage.

According to a cleaning process, thus described in French Patent No. 2,312,276, the sodium hydride and sodium oxide are transformed into sodium hydroxide by mutual reaction beyond 410° C. The reaction which occurs is as follows:

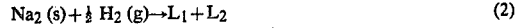

$$NaH\ (s) + Na_2O\ (s) \rightarrow L_1 + L_2 \qquad (3)$$

If the sodium hydride is in excess compared with the sodium oxide in the trap, the hydride is eliminated by decomposition as in the process described hereinbefore according to reaction (1). However, if the sodium oxide is in excess, it is transformed into the sodium hydroxide by hydrogenation according to reaction (2).

This process has the advantage of being more complete than the previous process, because it permits the transformation of both sodium hydride and sodium oxide, but also has the disadvantage, like the previous process, of having to be performed at a temperature above 410° C. and of being slow.

BRIEF SUMMARY OF THE INVENTION

The present invention relates to a process for cleaning a cold trap located in a circuit in which is circulating a liquid metal. This process can be performed at temperatures below 410° C., is particularly fast and permits a total cleaning of the trap, because it is possible, in the case of a sodium circuit, to eliminate the sodium hydroxide, sodium oxide and sodium hydride in the form of liquid effluents, whose easy purging is possible.

The invention therefore relates to a process for cleaning a cold trap incorporated into a circuit for a liquid metal or a mixture of liquid metals, whereby in said trap are deposited impurities consisting more particularly of the hydride and the oxide of the liquid metal or liquid metals in question, wherein it comprises the introduction into the trap of an alkali metal hydroxide in the liquid state and in excess compared with the solubility limits of the hydride and the oxide, the heating of the trap up to the total transformation of the impurities into liquid phases and the draining off of the liquid phases contained in the trap.

This process is more particularly applicable in the case when the liquid metal is sodium.

According to a seconary feature of the invention, the alkali metal hydroxide is sodium hydroxide and the heating of the trap leads to the transformation of the impurities into a first liquid phase constituted by a solution of hydrogen and oxygen in sodium and into a second liquid phase constituted b a solution of hydrogen and oxygen in sodium hydroxide. Preferably, a vacuum is established in the cold trap prior to the introduction of the sodium hydroxide in order to eliminate traces of water, which may possibly be contained in the sodium hydroxide and which may therefore come into contact with the sodium.

The invention also relates to an apparatus for cleaning a cold trap for performing the purification process defined hereinbefore, said apparatus comprising a container which serves to receive the alkali metal hydroxide positioned above the trap, a first valve permitting the introduction into the trap of the metal hydroxides contained in the container and a second valve permitting the draining of the trap.

According to a constructional variant, the apparatus comprises a draining container arranged below the trap.

According to a secondary feature of the invention, a heating device is associated with the container or containers and with the trap.

According to another secondary feature of the invention, the container or containers and the trap have in each case a pressure regulating tube and a pressure gauge.

DESCRIPTION OF THE DRAWING AND PREFERRED EMBODIMENTS

An embodiment of the invention will now be described in non-limitative manner, with reference to the single drawing which shows an apparatus for cleaning a cold trap arranged in a circuit in which is circulating a liquid metal.

The cleaning apparatus shown in the drawing comprises three superimposed stages constituted by an upper container, the trap 12 and a lower container 14. A pipe 16 controlled by a valve 18 is positioned between the upper container 10 and the cold trap 12 and a pipe 20 controlled by a valve 22 is positioned between the cold trap 12 and the lower container 14. Moreover, a draining valve 24 is positioned at the bottom of the lower container 14.

The cold trap 12 is incorporated into a circuit of a nuclear reactor in which circulates a liquid metal, for example sodium. Trap 12 communicates with the not shown sodium circuit by means of an intake pipe 28 and a discharge pipe 30, each pipe being provided with a stop valve, designated respectively by the reference numerals 29 and 31. Pipe 28 is connected to pipe 16 below the valve 18.

In per se known manner, the sodium which enters by the pipe 28 into trap 12 descends to the bottom of the latter to traverse a retension zone 32 constituted by stainless steel wool. Under the cooling action created by the circulation of nitrogen 33 around trap 12, the impurities contained in the sodium are deposited in the solid state in retension zone 32. The purified sodium rises via a central tube 34 and then passes through an exchanger-economiser 36 before leaving trap 12 by pipe 30.

As can be gathered from the drawing, the upper container 10 comprises a pressure regulating tube 38, which makes it possible at random to establish a vacuum or inject a neutral gas. The pressure in the container is measured by means of pressure gauge 40. In the same way, trap 12 and lower container 14 have in each case a pressure regulating tube 42, 39, as well as a pressure gauge 44, 41. Finally, containers 10, 14 and trap 12 are surrounded by one or more heating resistors 46, 48 and 50, respectively embedded in thermally insulated blocks 52, 54 and 56, which can be constituted by a single block or by two or three separate blocks.

When the stainless steel wool forming the retension zone 32 has stored a large quantity of impurities, mainly consisting of sodium hydride, sodium oxide and sodium hydroxide, it becomes necessary to clean cold trap 12, due to the danger of clogging or the reduction to the purified sodium flow rate. Before carrying out this operation, the cold trap is purged by opening the valves 22 and 24 after isolating the trap with respect to the remainder of the circuit by closing valves 29 and 31.

Valves 22 and 24 are then closed and sodium hydroxide is introduced into the upper container 10 and is brought into the liquid state by means of heating resistors 46 until a temperature of about 350° C. is reached. A vacuum is formed by tube 38, in such a way as to remove any possible traces of water. The sodium hydroxide is then placed under a neutral gas atmosphere, for example using argon, introduced by tube 38.

After heating the trap 12 and after bringing it to a pressure below that of container 10 by means of tubes 42, valve 18 is opened in such a way that a quantity of sodium hydroxide 58 in excess compared with the solubility limits of the sodium hydride and sodium oxide contained in the retension zone 32 at the temperature in question is introduced into the cold trap 12 by pipe 16. Thus, if the heating temperature is fixed at 355° C., at least 79 mole % of sodium hydroxide are introduced, the trapped impurities also containing 16 mole % sodium hydride and 5 mole % sodium oxide. If the hydroxide quantity introduced is lower, the heating temperature must be increased in order to completely clean the trap. The temperature is kept at about 355° C. in trap 12 for about 1 hour, due to the heating resistors 48. The sodium hydride and sodium oxide trapped in retension zone 32 dissolve completely in the sodium hydroxide according to the following transformation reactions:

$$NaH\ (s) + NaOH\ (l) \rightarrow L_2 \qquad (4)$$

$$Na_2O\ (s) + NaOH\ (l) \rightarrow L_2 \qquad (5)$$

$$NaH\ (s) + Na_2O\ (s) + NaOH\ (l) \rightarrow L_2 \qquad (6)$$

$$NaH\ (s) + Na_2O\ (s) + NaOH\ (l) \rightarrow L_1 + L_2 \qquad (7)$$

In which, as indicated hereinbefore, $L_1$ is a liquid phase constituted by a solution of hydrogen and oxygen in sodium and $L_2$ is a liquid phase which is a solution of hydrogen and oxygen in sodium hydroxide.

The internal volume of trap 12 should be completely filled with sodium hydroxide for the following reasons:

In this way, it is possible to ensure the dissolving of impurities, possibly deposited in the upper part of the trap; through minimising the free volume above the liquid surface contained in the trap, there is a consequent minimisation of tritium release in the sleeve volume, the tritium remaining in the liquid.

Moreover, in the case where the trap contains adhesive deposits which are difficult to dissolve, it is possible to facilitate dissolving by creating a sodium hydroxide circulation in closed circuit between container 10 and trap 12, due to not shown piping.

In order to maintain phases $L_1$ and $L_2$ in the liquid state, the heating of trap 12 by means of resistors 48 continues until the drainage valve 22 is opened. The lower container 14 is heated beforehand by means of heating resistor 50 and, by means of tube 39, is brought to a pressure lower than that of trap 12. Finally, said pot is itself drained by means of valve 24 into one or more appropriate receptacles.

If desired, the liquid phases $L_1$ and $L_2$ from container 14 can be collected in separate containers, utilising the density differences of said two phases, phase $L_2$ being denser than phase $L_1$.

The cleaning apparatus described in this embodiment, as well as the process whose performance it ensures make it possible to clean trap 12 simply and rapidly (approximately 1 hour), whilst obtaining the effluents in the liquid state.

The cleaning temperature (approximately 350° C.) is less high than in the prior art processes, which reduces the corrosion of the trap by sodium hydroxide, because this phenomenon increases with the temperature. The process can be performed in simple equipment which, due to the fact that the cleaning temperature is lower, operates under a lower hydrogen pressure than in the prior art processes. This minimises the quantity of tritium released in the gaseous effluents. Most of the tritium is trapped in the liquid phases and can be recovered by a subsequent treatment process.

In addition to the elimination of sodium hydride and sodium oxide trapped in retension zone 32, this process also makes it possible to eliminate sodium carbonate ($Na_2CO_3$), which is soluble to a significant extent in sodium hydroxide. This sodium carbonate can be present in the impurities held back in the trap.

The invention is not limited to the embodiments described hereinbefore and numerous variants thereto are possible without passing beyond the scope of the invention.

Thus, according to a variant of the apparatus, the lower draining container 14 is eliminated and the draining of trap 12, after cleaning the latter, takes place into the upper container 10 by means of a not shown tube, whereby a pressure lower than that in trap 12 is established in container 10.

According to a variant of the process described hereinbefore the sodium hydroxide can be replaced by another alkali metal hydroxide and particularly by potassium hydroxide, whose price is essentially the same and whose physical and chemical properties are similar. Thus, the melting point of sodium hydroxide is 318° C., whilst that of potassium oxide is 360° C.

Finally, although the embodiment described hereinbefore relates to a sodium circuit, the invention can also be applied to other liquid metals or to mixtures of liquid metals, for example sodium and potassium.

What is claimed is:

1. A process for cleaning a cold trap incorporated into a circuit for a liquid metal or a mixture of liquid metals, whereby in said trap are deposited impurities consisting of the hydride and the oxide of the liquid metal or liquid metals in question, comprising the steps of introducing into the trap an alkali metal hydroxide in liquid state and in excess compared with solubility limits of the hydride and the oxide, then heating of the trap up to total transformation of the impurities into liquid phases and draining off of the liquid phases contained in the trap said steps being carried out in the absence of water.

2. A cleaning process according to claim 1, wherein the liquid metal is sodium.

3. A cleaning process according to claim 1, wherein the alkali metal hydroxide is sodium hydroxide and wherein the heating of the trap leads to the transformation of the impurities into a first liquid phase constituted by a solution of hydrogen and oxygen in sodium and into a second liquid phase constituted by a solution of hydrogen and oxygen in sodium hydroxide.

4. A cleaning process accoding to claim 3, wherein the sodium hydroxide is introduced after its moisture has previously been removed by heating in vacuum.

* * * * *